(12) United States Patent
Arun

(10) Patent No.: US 7,986,974 B2
(45) Date of Patent: Jul. 26, 2011

(54) CONTEXT SPECIFIC SPEAKER ADAPTATION USER INTERFACE

(75) Inventor: Uma Arun, Novi, MI (US)

(73) Assignee: General Motors LLC, Detroit, MI (US)

( * ) Notice: Subject to any disclaimer, the term of this patent is extended or adjusted under 35 U.S.C. 154(b) by 1719 days.

(21) Appl. No.: 10/444,270

(22) Filed: May 23, 2003

(65) Prior Publication Data
US 2004/0235530 A1 Nov. 25, 2004

(51) Int. Cl.
H04B 1/38 (2006.01)

(52) U.S. Cl. ............... 455/563; 455/569.1; 455/569.2; 379/88.07; 379/907; 379/93.34; 379/406.03; 704/275

(58) Field of Classification Search ............... 455/563, 455/569.1, 569.2; 379/88.07, 907, 93.34, 379/406.03; 704/275
See application file for complete search history.

(56) References Cited

U.S. PATENT DOCUMENTS

| | | | | |
|---|---|---|---|---|
| 4,731,811 A * | 3/1988 | Dubus | ............... | 455/563 |
| 4,776,016 A * | 10/1988 | Hansen | ............... | 704/275 |
| 5,476,010 A * | 12/1995 | Fleming et al. | ............... | 73/620 |
| 5,794,205 A * | 8/1998 | Walters et al. | ............... | 704/275 |
| 5,805,672 A * | 9/1998 | Barkat et al. | ............... | 379/88.03 |
| 5,832,440 A * | 11/1998 | Woodbridge et al. | ............... | 704/275 |
| 5,874,939 A * | 2/1999 | Galvin | ............... | 345/156 |
| 5,893,902 A * | 4/1999 | Transue et al. | ............... | 704/275 |
| 5,960,393 A * | 9/1999 | Cohrs et al. | ............... | 704/240 |
| 5,999,895 A * | 12/1999 | Forest | ............... | 704/1 |
| 6,112,103 A * | 8/2000 | Puthuff | ............... | 455/557 |
| 6,256,611 B1* | 7/2001 | Ali-Yrkko | ............... | 704/275 |
| 6,289,140 B1* | 9/2001 | Oliver | ............... | 382/313 |
| 6,477,498 B1* | 11/2002 | Gortz et al. | ............... | 704/275 |
| 6,587,824 B1* | 7/2003 | Everhart et al. | ............... | 704/275 |
| 6,601,029 B1* | 7/2003 | Pickering | ............... | 704/257 |
| 6,735,632 B1* | 5/2004 | Kiraly et al. | ............... | 709/229 |
| 6,804,806 B1* | 10/2004 | Bansal et al. | ............... | 715/500.1 |
| 2003/0083873 A1* | 5/2003 | Ross et al. | ............... | 704/246 |
| 2003/0120493 A1* | 6/2003 | Gupta | ............... | 704/270.1 |

* cited by examiner

*Primary Examiner* — Zhiyu Lu
(74) *Attorney, Agent, or Firm* — Anthony L. Simon; Reising Ethington P.C.

(57) ABSTRACT

A method for providing a context specific speaker adaptation user interface is disclosed. The method allows a specific user of a voice activated system to train a voice recognition system to understand specific uttered commands by receiving a training sequence initiation input, sending at least one command to be trained, receiving a selection input, prompting a verbal input, recording the verbal input, and linking a voice input with an instruction corresponding with the command input.

7 Claims, 2 Drawing Sheets

200

CONTEXT SPECIFIC SPEAKER ADAPTATION USER INTERFACE

FIELD OF THE INVENTION

In general, the invention relates to wireless communication systems. More specifically, the invention relates to voice recognition within wireless communication systems and in particular, to a method for context specific speaker adaptation.

BACKGROUND OF THE INVENTION

Telematic communication units (TCU's) such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and facsimile (FAX) messages from virtually anywhere on earth. Such communication can be initiated at the TCU when it is turned on, or by entering a phone number to be called, or in many cases, by speaking a voice command to a voice recognition system (VR), causing the TCU to automatically complete the process of dialing the number to be called.

Current voice dependent VR systems use the recorded words of a user (speaker) to modify the recognition capability. A voice dependent system requires the system be trained in the speaker's own voice. This may typically take 15 minutes and require the user to navigate through a menu of choices. However, a voice dependent VR system that has been trained under one noise condition can have more difficulty recognizing the same speaker in a different noise condition.

Additionally, a problem has been identified through a marketing study conducted by Forrester entitled "Voice Portals Speak to Few". The study indicates customer dissatisfaction with VR systems is highest (24%) for the "accuracy of voice recognition" category. Lack of correct character recognition is a major source of customer dissatisfaction of many voice recognition systems. An Owners Customer Satisfaction survey also shows that "voice recognition" is the number one customer complaint with the current technology (answered affirmatively from 37% of respondents). This lack of accuracy, whether real or perceived, has resulted in increased warranty claims for VR system repair.

Construction of a single speech recognition engine that can take care of all dialects and accents is quite difficult. Yet, companies want to provide their customers with flawless service and products. Many companies want to provide an interface that provides flawless and customized customer interfaces with visual, audible, tactical and speech capabilities matched to each customer.

Thus, there is a significant need for a method and system for improving voice recognition that overcomes the above disadvantages and shortcomings, as well as other disadvantages.

SUMMARY OF THE INVENTION

One aspect of the invention presents a method for customizing an in-vehicle communication system. The method comprises receiving a training sequence initiation input from an in-vehicle user and sending at least one command to be trained in response to the initiation input. The method then receives a selection input corresponding to the command and sends a prompt for the user's verbal command input for the command corresponding to the selection input. The method then records the user's verbal command input and links the recorded verbal command input with an instruction corresponding with the command.

Another aspect of the invention presents a computer readable medium for customizing an in-vehicle communication system. The computer readable medium comprises computer readable code for receiving a training sequence initiation input from an in-vehicle user and sending at least one command to be trained in response to the initiation input. The computer readable medium further comprises computer readable code for receiving a selection input corresponding to the command and sending a prompt for the user's verbal command input for the command corresponding to the selection input. The computer readable medium further comprises computer readable code for recording the user's verbal command input and linking the recorded verbal command input with an instruction corresponding with the command.

Another aspect of the invention provides a system for customizing an in-vehicle communication system. The system comprises means for receiving a training sequence initiation input from an in-vehicle user and means for sending at least one command to be trained in response to the initiation input. The system further comprises means for receiving a selection input corresponding to the command and means for sending a prompt for the user's verbal command input for the command corresponding to the selection input. The system further comprises means for recording the user's verbal command input and means for linking the recorded verbal command input with an instruction corresponding with the command.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
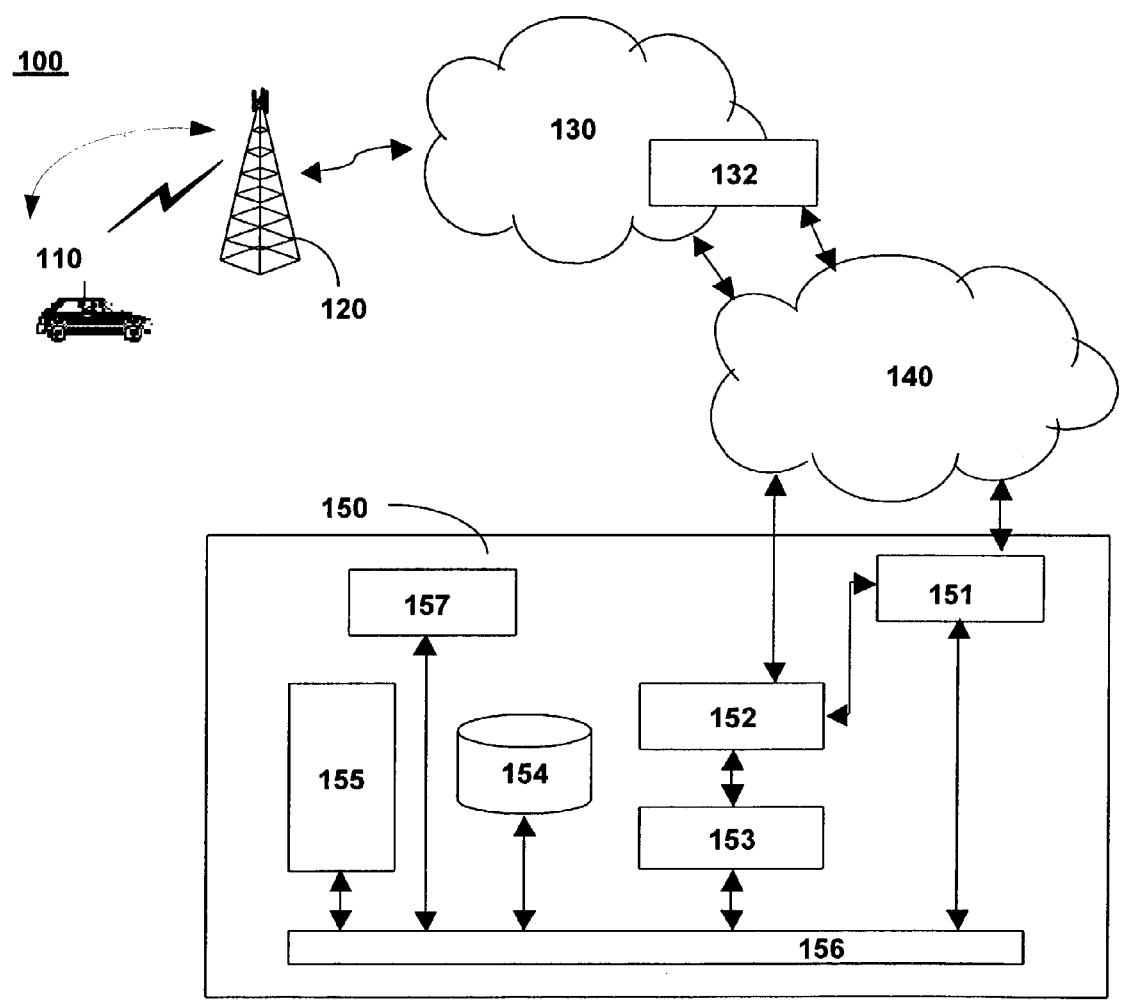
FIG. 1 is a schematic diagram for one embodiment of a system for accessing a voice recognition system using a wireless communication system, in accordance with the current invention.

FIG. 1 shows an illustration of one embodiment of a system for communicating with a mobile vehicle using a wireless communication system in accordance with the present invention, and is also referred to as a mobile vehicle communication system (MVCS) 100. The mobile vehicle communication system 100 may contain one or more mobile vehicles (mobile vehicle communication unit, MVCU) 110, one or more wireless carrier systems (wireless service providers) 120, one or more communication networks 130, one or more short message service centers 132, one or more land networks 140, and one or more call centers 150. One embodiment of the call center 150 contains one or more switches 151, one or more data transmission devices 152, one or more communication services managers 153, one or more communication services databases 154, one or more advisors 155, one or more bus systems 156, and one or more automatic speech recognition (ASR) units 157.

MCVU 110 includes a wireless vehicle communication device (module, MVCS module) such as an analog or digital phone with suitable hardware and software for transmitting and receiving data communications. In one embodiment, MCVU 110 further includes a wireless modem for transmitting and receiving data. In another embodiment, MCVU 110 includes a digital signal processor with software and additional hardware to enable communications with the mobile vehicle and to perform other routine and requested services.

Additionally, MCVU 110 includes a global positioning system (GPS) unit capable of determining synchronized time and a geophysical location of the mobile vehicle. In operation, MCVU 110 sends to and receives radio transmissions from wireless carrier system 120. MCVU 110 is also referred to as a mobile vehicle throughout the discussion below. In operation, MCVU 110 may be implemented as a motor vehicle, a marine vehicle, or as an aircraft.

In a further embodiment, MCVU 110 contains an automatic speech recognition system (ASR) capable of communicating with the wireless vehicle communication device, and contains a voice recognition engine (VRE) capable of word, phrase, or sentence recognition. An additional embodiment of the module provides the capacity of functioning as any part of, or as all of the above communication devices. In another embodiment of the invention, the module is capable of data storage, and/or data retrieval, and/or receiving, processing, and transmitting data queries. In another embodiment, MCVU 110 comprises a button that a user pushes to initiate a training sequence in accordance with the invention.

In yet another embodiment, the MVCS module further includes an audio speaker, a synthesized voice output, an audio channel, or the like. In an example, a MVCS module is implemented, in addition to the receiver, as a set of headphones, the audio portion of a television, a display device, speakers, or the like.

Wireless carrier system 120 is a wireless communications carrier or a mobile telephone system and transmits to and receives signals from one or more MCVU 110. In one example, the mobile telephone system is an analog mobile telephone system operating over a prescribed band nominally at 800 MHz. In another embodiment, the mobile telephone system is a digital mobile telephone system operating over a prescribed band nominally at 800 MHz, 900 MHz, 1900 MHz, or any suitable band capable of carrying mobile communications.

A further embodiment of the MVCS 100 provides the wireless carrier system 120 to be connected with communications network 130. One example of the communications network 130 contains a mobile switching center and provides services from one or more wireless communications companies.

Another embodiment of the MVCS 100 allows for communications network 130 to be any suitable system or collection of systems for connecting wireless carrier system 120 to at least one mobile vehicle 110 or to a call center.

Communications network 130 includes one or more short message service centers 132. Short message service center 132 is capable of prescribing alphanumeric short messages to and from mobile vehicles 110, and includes message entry features, administrative controls, and message transmission capabilities. For one embodiment of the invention, the short message service center 132 includes one or more automated speech recognition (ASR) units. Another example of the short message service center 132 stores and buffers the messages, and includes functional services (short message services) such as paging, text messaging and message waiting notification. An example of the short message services includes telematic services such as broadcast services, time-driven message delivery, autonomous message delivery, and database-driven information services. Another example of the short message services includes message management features, such as message priority levels, service categories, expiration dates, cancellations, and status checks.

A public-switched telephone network is one example of the land network 140, and contains at least one wired network, optical network, fiber network, wireless network, or any combination thereof. Another example of the land network 140 is in communication with an Internet protocol (IP) network. A further example of the land network 140 connects the communications network 130 to a call center. Yet another example of the land network 140 connects a first wireless carrier system 120 with a second wireless carrier system 120, and also connects wireless carrier system 120 to a communication node or call center 150 with the use of the communication network 130. In another embodiment of the invention, a communication system references all or part of the wireless carrier system 120, communications network 130, land network 140, and short message service center 132.

Call center 150 is a location where many calls can be received and serviced at the same time, or where many calls may be sent at the same time. Example call centers are telematic call centers, prescribing communications to and from mobile vehicles 110, voice call centers, providing verbal communications between an advisor in the call center and a subscriber in a mobile vehicle, and voice activated call centers, providing verbal communications between an ASR unit and a subscriber in a mobile vehicle. The call center may contain any combination of hardware or software facilitating data transmissions between call center 150 and mobile vehicle 110. A further embodiment of the invention provides that the call center contains any of the previously described functions.

One embodiment of the call center contains switch 151. Switch 151 is connected to land network 140, and receives a modem signal from an analog modem or from a digital modem. Switch 151 transmits voice or data transmission from the communication node. Another embodiment of switch 151 can receive voice or data transmissions from mobile vehicle 110 through wireless carrier system 120, communications network 130, and land network 140, and can receive from or send data transmissions to data transmission device 152. A further embodiment of switch 151 can receive from or send voice transmissions to advisor 155 via bus system 156. Switch 151 can receive from or send voice transmissions to one or more automated speech recognition (ASR) units 157 via bus system 156.

Data transmission device 152 sends or receives data from switch 151. An example data transmission device 152 is an IP router or a modem. Data transmission device 152 transfers data to or from advisor 155, one or more communication services managers 153, one or more communication services databases 154, one or more automated speech recognition (ASR) units 157, and any other device connected to bus system 156. Another example of data transmission device 152 conveys information received from short message service center 132 in communication network 130 to communication services manager 153.

The communication services manager 153 is connected to switch 151, data transmission device 152, and advisor 155 through bus system 156. Another embodiment of the communication services manager 153 receives information from mobile vehicle 110 through wireless carrier system 120, short message service center 132 in communication network 130, land network 140, and data transmission device 152. Additionally, an embodiment of communication services manager 153 sends information to mobile vehicle 110 through data transmission device 152, land network 140, communication network 130 and wireless carrier system 120. Further embodiments of the communication services manager 153 send short message service messages via short message service center 132 to the mobile vehicle, receive short message service replies from mobile vehicle 110 via short message service center 132, send short message service requests to mobile vehicle 110, and receive from or send voice transmissions to one or more automated speech recognition (ASR) units 157.

Communication services database 154 contains records on one or more mobile vehicles 110, with a portion of communication services database 154 dedicated to short message services. In an example, records in communication services database 154 include vehicle identification, location information, diagnostic information, status information, recent action information, and vehicle passenger (user, customer) and operator (user, customer) defined preset conditions regarding mobile vehicle 110 and any of the communication services. Another embodiment of the invention requires that communication services database 154 provide information and other support to communication services manager 153 and automated speech recognition (ASR) units 157, and to external VRE services.

Examples of advisor 155 are real advisors and virtual advisors. A real advisor is a human being in verbal communication with mobile communication device 110. A virtual advisor is a synthesized voice interface responding to requests from mobile communication device 110. Advisor 155 provides services to mobile communication device 110, and can communicate with communication services manager 153, automated speech recognition (ASR) units 157, or any other device connected to bus system 156 or mobile communication device 110. Another embodiment of the invention allows for the advisor 155 and ASR units 157 to be integrated as a single unit capable of any features described for either.

Figure 2:
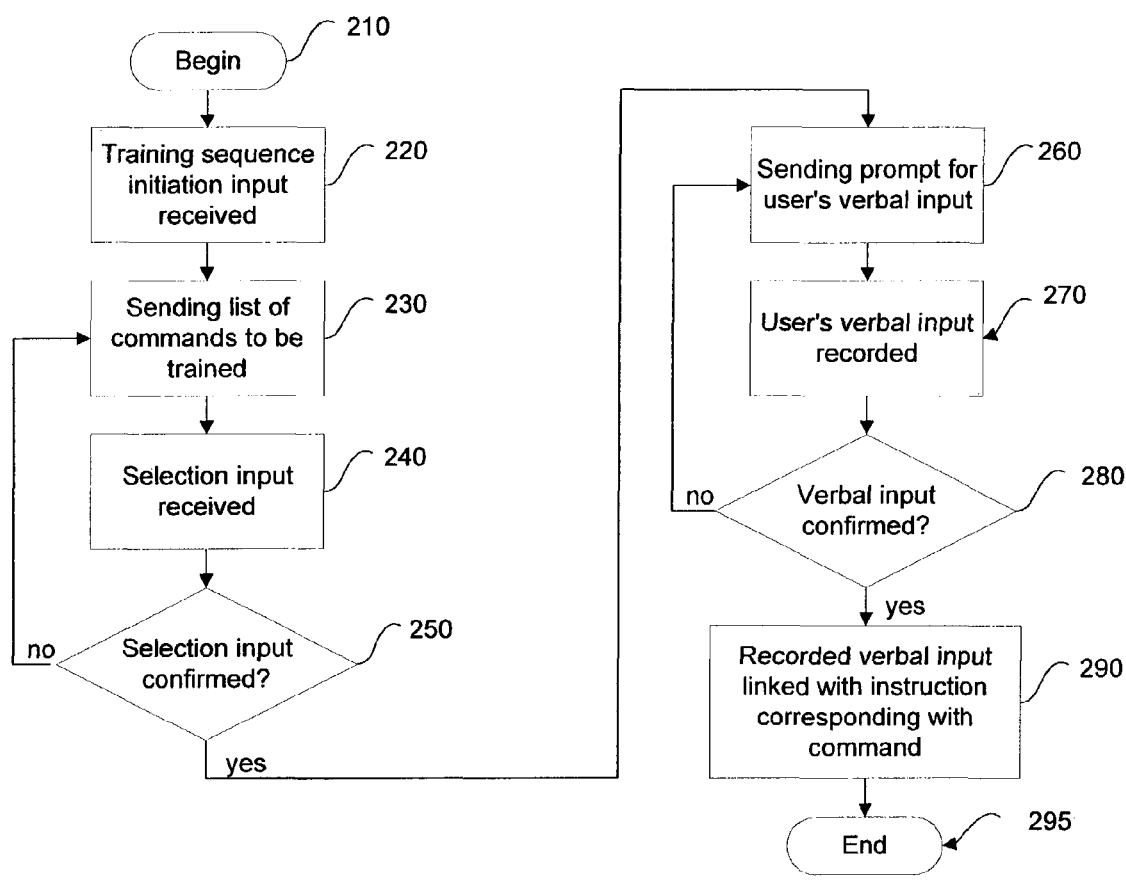
FIG. 2 is a flowchart outlining one embodiment of a method in accordance with the instant invention.

FIG. 2 is a flowchart illustrating one embodiment of a method for customizing an in-vehicle communication system in accordance with the present invention. The method begins at block 210. At block 220, the method receives a training sequence initiation input. The training sequence initiation input may be received from a user pushing a button or selecting an option from a menu, or a hierarchy of menus. In one embodiment, the user presses a button continuously for a period of time to initiate the training sequence. In another embodiment, the input results from pressing a predetermined sequence of buttons, or a predetermined number of buttons. In one example, the user simultaneously presses two buttons to initiate training. In another example, the user presses a button for 3-5 seconds to initiate the training sequence. After receiving the training sequence initiation input, the method enters a command training session. In one embodiment, the command training session uses a speech recognition application.

At block 230, the method sends a list of commands to be trained. The method may use a speech recognition application, or other application, to send the list of commands. In a currently preferred embodiment, the list of commands comprises a predetermined list of commands that are able to be trained. In a currently preferred embodiment, these commands comprise commands to DIAL a phone number, STORE a location or phone number, enter the NAVIGATION system, seek HELP from an advisor, and other appropriate commands for use with a MVCU. The list may be sent with a display, or may be sent audibly with the use of speakers or headphones. If sent audibly, the sound may be generated by a computer, or may comprise the use of previously stored sounds. Preferably, the method will momentarily pause between each sent command to enable a user of the system to respond. A user may provide a selection input upon receiving the command to be trained.

At block 240, the method receives the selection input. The selection input may be received by receiving a button push, as in block 220, or the selection input may be received by a speech recognition application, or other audible command. Optimally, the method will confirm the input at block 250, and upon confirmation will forward to block 260. In the event that the input is not confirmed, the method will revert to block 230 and repeat the list of commands to be trained. At block 250, confirming the selection input may comprise repeating the selection input with a display, or by playing sounds through a speaker or headphones. A user may confirm the selection input by again pushing the button for a predetermined time, or by an audible command. In one embodiment of the method, a speech recognition application states "DO YOU WANT TO TRAIN" and then repeats the command to be trained. In other embodiments, the user may push a button once to confirm the selection, or push the button twice to reject the selection. After the selection has been received, the method sends a prompt for a user's verbal input at block 260.

In one example, sending a prompt for a user's verbal input at block 260 comprises using a display or a speech recognition application to send an audible prompt through speakers or headphones. The method may ask the user to delineate their recitation of the command by pressing a button or by stating a predetermined start and end input. In one embodiment, the method states "PLEASE SAY THE COMMAND IN A WAY YOU WILL SAY. PLEASE PRESS THE BUTTON BEFORE SAYING THE COMMAND. AFTER YOU ARE DONE, PRESS THE BUTTON AGAIN."

The method then receives the user's verbal input and records the input at block 270. The input may be recorded in the MVCU, or may be relayed over the communications network to be stored at a remote location. The method may record the input digitally, or with the use of analog technology such as cassette tape.

The method then confirms the user's verbal input at block 280. Optimally, the verbal input is confirmed by playing a recording of the verbal input. In one embodiment, the confirmation of the verbal input comprises a speech recognition application that states that the selected command "IS TRAINED AS" and plays the recording of the user's verbal input. The user may confirm the trained command by pressing a button or by providing an audible response. If the user rejects the trained command, the method returns to block 260 and provides a prompt for the user's verbal input. If the user confirms the trained command, the method proceeds to block 290.

At block 290, the recorded verbal input is linked with an instruction corresponding with the command.

The method may be repeated to train further commands. In such an embodiment of the invention, after the recorded verbal input is linked with an instruction corresponding with the command, the method seeks an additional input from the user to determine if the user desires to train additional commands. If the user's response indicates a desire to train further commands, the method will return to block 230, and continue iterating the steps of the method until the method receives a response from the user that no further commands are to be trained.

The method ends at block 295.

The above-described methods and implementation for voice recognition through a context specific speaker adaptation user interface and associated information are example methods and implementations. These methods and implementations illustrate one possible approach for providing a customer voice recognition profile in a meaningful way to improve a VR engine. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

What is claimed is:

1. A method for customizing an in-vehicle communication system, the method comprising:
   receiving a training sequence initiation input from an in-vehicle user;
   sending commands of a predetermined list of commands responsive to the initiation input;
   pausing between the commands;
   receiving a selection input corresponding to a command to be trained from the predetermined list of commands, while the predetermined list is being sent to the in-vehicle user, wherein the user provides the selection input upon receiving the command to be trained;
   confirming the selection input by repeating the selection input and receiving confirmation from the user;
   sending a prompt for the user's verbal command input for the command corresponding with the selection input;
   recording the user's verbal command input; and
   confirming the user's verbal input by playing a recording of the user's verbal input;
   linking the recorded verbal command input with an instruction corresponding with the command input if the user confirms the command; and
   sending another prompt for the user's verbal command input for the command corresponding with the selection input if the user rejects the command.

2. The method of claim 1, wherein receiving the training sequence initiation input comprises receiving a button push.

3. The method of claim 1, wherein sending the at least one command further comprises a communication method selected from a group consisting of ASCII characters, prerecorded speech, and computer generated speech.

4. The method of claim 1 wherein the user's verbal command input is stored at a location selected from the group consisting of the user's vehicle and a call service center.

5. The method of claim 1, wherein sending the prompt for a user's verbal command input comprises a communication method selected from a group consisting of ASCII characters, prerecorded speech, and computer generated speech.

6. A non-transitory computer readable medium storing a computer program for customizing an in-vehicle communication system comprising:
   computer readable code for receiving a training sequence initiation input from an in-vehicle user;
   computer readable code for sending commands of a predetermined list of commands responsive to the initiation input;
   computer readable code for pausing between the commands;
   computer readable code for receiving a selection input corresponding to a command to be trained from the predetermined list of commands, while the predetermined list is being sent to the in-vehicle user, wherein the user provides the selection input upon receiving the command to be trained;
   computer readable code for confirming the selection input by repeating the selection input and receiving confirmation from the user;
   computer readable code for sending a prompt for user's verbal command input for the command corresponding with the selection input;
   computer readable code for recording the user's verbal command input;
   computer readable code for confirming the user's verbal input by playing a recording of the user's verbal input;
   computer readable code for linking the recorded verbal command input with an instruction corresponding with the command if the user confirms the command; and
   computer readable code for sending another prompt for the user's verbal command input for the command corresponding with the selection input if the user rejects the command.

7. A system for customizing an in-vehicle communication system, the system comprising:
   means for receiving a training sequence initiation input from an in-vehicle user;
   means for sending commands of a predetermined list of commands responsive to the initiation input;
   means for pausing between the commands;
   means for receiving a selection input corresponding to a command to be trained from the predetermined list of commands, while the predetermined list is being sent to the in-vehicle user, wherein the user provides the selection input upon receiving the command to be trained;
   means for confirming the selection input by repeating the selection input and receiving confirmation from the user;
   means for sending a prompt for user's verbal command input for the command corresponding with the selection input;
   means for recording the user's verbal command input;
   means for confirming the user's verbal input by playing a recording of the user's verbal input;
   means for linking the recorded verbal command input with an instruction corresponding with the command if the user confirms the command; and
   means for sending another prompt for the user's verbal command input for the command corresponding with the selection input if the user rejects the command.

* * * * *